(12) United States Patent
Nishikawa et al.

(10) Patent No.: US 7,874,626 B2
(45) Date of Patent: Jan. 25, 2011

(54) HYDRAULIC MODULATOR FOR BRAKE DEVICE

(75) Inventors: Yutaka Nishikawa, Saitama (JP); Kazuya Takenouchi, Saitama (JP); Masaie Kato, Saitama (JP); Shinji Takayanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 11/785,202

(22) Filed: Apr. 16, 2007

(65) Prior Publication Data

US 2007/0252430 A1 Nov. 1, 2007

(30) Foreign Application Priority Data

Apr. 19, 2006 (JP) .............................. 2006-115990

(51) Int. Cl.
*B60T 8/42* (2006.01)
*B60L 7/00* (2006.01)
*F16D 55/08* (2006.01)

(52) U.S. Cl. .................. 303/115.2; 188/162; 188/72.6; 188/72.8

(58) Field of Classification Search .............. 303/115.1, 303/115.2; 60/538, 545; 188/72.6, 72.7, 188/72.8, 156, 157, 158, 161, 162
See application file for complete search history.

(56) References Cited

U.S. PATENT DOCUMENTS

| 4,653,815 | A | 3/1987 | Agarwal et al. |
| 4,850,650 | A | 7/1989 | Eckert et al. |
| 5,302,008 | A | 4/1994 | Miyake et al. |
| 5,667,284 | A | 9/1997 | Drennen et al. |
| 5,720,531 | A * | 2/1998 | Fulks ..................... 303/115.2 |
| 5,758,930 | A * | 6/1998 | Schiel et al. ............. 303/113.4 |
| 6,231,133 | B1 * | 5/2001 | Tsukamoto .............. 303/115.2 |
| 2005/0168059 | A1 | 8/2005 | Nishikawa et al. |
| 2006/0043788 | A1 * | 3/2006 | Schluter .................. 303/115.1 |

FOREIGN PATENT DOCUMENTS

| DE | 3939091 A1 * | 5/1991 |
| JP | 1-262244 A | 10/1989 |
| JP | 2005-212680 A | 8/2005 |
| WO | WO-96/39318 A1 | 12/1996 |

* cited by examiner

*Primary Examiner*—Thomas J Williams
(74) *Attorney, Agent, or Firm*—Birch, Stewart, Kolasch & Birch, LLP

(57) ABSTRACT

A hydraulic modulator includes a cylinder for slidably supporting a power piston and changing the volume of a hydraulic chamber communicating with brake calipers according to the sliding of the power piston, and an electric motor for sliding the power piston through a power transmitting mechanism. The cylinder extends parallel to a rotating shaft, and a rotational motion of the electric motor is converted into a linear motion on an axis parallel to the rotating shaft. The power transmitting mechanism is provided by a ball screw mechanism composed of a ball screw nut, balls, and a ball screw shaft for converting the rotational motion of the electric motor into the linear motion of the push slider. The push slider has a head portion coming into spherical contact with the power piston. The hydraulic modulator so configured has a small size, and an improved arrangement of components.

20 Claims, 12 Drawing Sheets

HYDRAULIC MODULATOR FOR BRAKE DEVICE

CROSS-REFERENCE TO RELATED APPLICATION

The present application claims priority under 35 U.S.C. §119 to Japanese Patent Application No. 2006-115990, filed Apr. 19, 2006, the entire contents of which are hereby incorporated by reference.

BACKGROUND OF THE INVENTION

1. Field of the Invention

The present invention relates to a hydraulic modulator for a brake device, and more particularly to a hydraulic modulator for a brake device which can be reduced in size by improving the arrangement of components and the internal structure.

2. Description of Background Art

Conventionally known is a brake system such that in operating a hydraulic brake to reduce a vehicle speed, an oil pressure for operating a brake caliper is obtained by the drive force of an actuator to thereby assist a brake operation by the operator. A device adapted to be applied to such a brake system to generate an oil pressure by using the drive force of the actuator will be hereinafter referred to generally as a hydraulic modulator. The hydraulic modulator capable of performing minute hydraulic control by electronic control of the actuator is suitable for use with an antilock brake system (ABS) for avoiding wheel locking upon braking by intermittently reducing the oil pressure produced in the brake caliper and also suitable for use with a front and rear interlocked brake system for automatically distributing a braking force to the front and rear wheels according to a vehicle running condition such as a vehicle speed.

Japanese Patent Laid-Open No. Hei 1-262244 discloses a hydraulic modulator such that a piston is slidably held in a cylinder for supplying a pressurized brake fluid to a brake caliper and that the piston is connected through a screw mechanism to a rotating shaft of an electric motor. With this configuration, the piston is slid by driving the electric motor to thereby generate an oil pressure required for the operation of the brake caliper.

Japanese Patent Laid-Open No. 2005-212680 discloses a hydraulic modulator such that a rotating shaft of an electric motor and a cylinder for supplying a pressurized brake fluid to a brake caliper extend in perpendicular relationship with each other, that the drive force of the electric motor is transmitted through a speed reducing mechanism to another rotating shaft on which a swing arm is mounted, and that a piston slidably held in the cylinder is slid by the operation of the swing arm.

However, the technique described in Japanese Patent Laid-Open No. Hei 1-262244 has a problem such that the hydraulic modulator tends to be elongated in the axial direction of the rotating shaft of the electric motor because the piston extends on the axis of the rotating shaft of the electric motor. Further, the technique described in Japanese Patent Laid-Open No. 2005-212680 has a problem such that an unwanted space is generated between the electric motor and the cylinder to cause an increase in overall size of the hydraulic modulator because the electric motor and the cylinder as elongated components extend perpendicularly to each other. Accordingly, it is difficult to ensure an installation space for such a conventional hydraulic modulator in a motorcycle limited in extra space, and it is therefore susceptible to improvement in configuring a hydraulic modulator which is compact with a small unwanted space and suitable for use in a motorcycle.

It is accordingly an object of the present invention to provide a hydraulic modulator for a brake device which can be reduced in size by improving the arrangement of components and the internal structure.

SUMMARY AND OBJECTS OF THE INVENTION

In accordance with a first aspect of the present invention, a hydraulic modulator for a brake device includes a cylinder for slidably supporting a piston and changing the volume of a hydraulic chamber communicating with a brake caliper according to the sliding of the piston; and a motor for sliding the piston through power transmitting means. The power transmitting means is arranged so that the cylinder extends parallel to a rotating shaft of the motor. A rotational motion of the motor is converted into a linear motion on an axis parallel to the rotating shaft.

In accordance with a second aspect of the present invention, the power transmitting means includes a push slider for pushing the piston; the piston and the push slider being in spherical contact with each other; the hydraulic modulator further including a stroke sensor having a sensor rod retractably supported for detecting the position of the push slider; the stroke sensor being arranged so that the sensor rod extends parallel to the cylinder.

In accordance with a third aspect of the present invention, the cylinder and the stroke sensor are set smaller in axial size than the motor.

In accordance with a fourth aspect of the present invention, the power transmitting means includes a ball screw mechanism for converting the rotational motion to the linear motion.

Effect of the Invention

According to the first aspect, the rotational motion of the motor is converted into the linear motion on the axis parallel to the rotating shaft by the power transmitting means, and the cylinder extends parallel to the rotating shaft of the motor. Accordingly, as compared with the conventional configuration such that a cylinder extends on the extension of a rotating shaft of a motor or that the motor and the cylinder as elongated components are arranged perpendicularly to each other, causing the formation of an unwanted space, it is possible to obtain a compact hydraulic modulator suitable for use in a motorcycle.

According to the second aspect, the contact surface of the push slider to the piston is a spherical surface, so that the inclination or misalignment of parts due to dimensional tolerance or the like can be absorbed by the spherical contact surface to thereby reduce friction and its related transmission loss of the pushing force of the push slider. Further, the sensor rod of the stroke sensor for detecting the position of the push slider extends parallel to the cylinder. With this arrangement, it is possible to prevent that the stroke sensor as an elongated component may project from the hydraulic modulator, thereby further reducing the size of the hydraulic modulator.

According to the third aspect, the cylinder and the stroke sensor are smaller in axial size than the motor. Accordingly, the size of the hydraulic modulator can be further reduced.

According to the fourth aspect, the power transmitting means includes a ball screw mechanism for converting the rotational motion into the linear motion. The ball screw mechanism is capable of performing high-precision positioning with low friction loss. Accordingly, it is possible to perform high-precision hydraulic control according to the drive control to the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
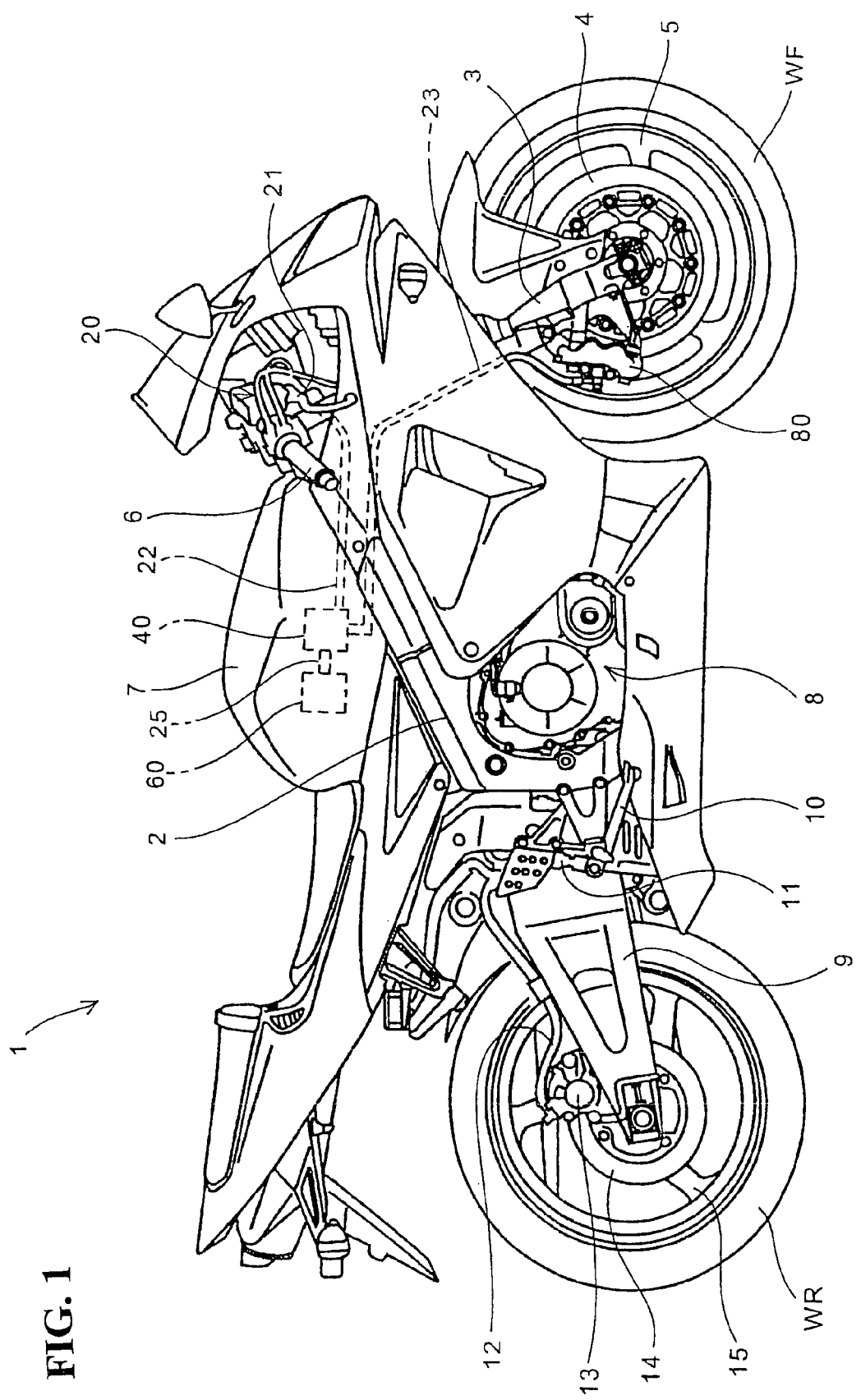
FIG. 1 is a side view of a motorcycle according to a first preferred embodiment of the present invention.

Some preferred embodiments of the present invention will now be described in detail with reference to the drawings. FIG. 1 is a side view of a motorcycle 1 to which a hydraulic modulator for a brake device according to a first preferred embodiment of the present invention is applied. A pair of right and left front forks 3 steerable by a pair of right and left steering handles 6 is pivotably supported to the front end portion of a body frame 2 of the motorcycle 1. A front wheel WF is rotatably supported to the lower end portions of the front forks 3. An engine 8 as a drive source is hung from the lower portion of the body frame 2. A swing arm 9 for rotatably supporting a rear wheel WR as a drive wheel is pivotably mounted to the body frame 2 on the rear side of the engine 8.

Each of the front and rear wheels WF and WR of the motorcycle 1 is provided with a hydraulic brake system for reducing the vehicle speed of the motorcycle 1. The right steering handle 6 is provided with a brake lever 21 to be operated by the rider in producing a brake force for the front wheel WF and a master cylinder 20 for pivotably supporting the brake lever 21. A pair of right and left circular brake discs 4 is connected to a wheel 5 of the front wheel WF so as to rotate integrally with the wheel 5. A pair of right and left brake calipers 80 is mounted on the right and left front forks 3, respectively.

Each brake caliper 80 is formed with a recess for receiving the corresponding brake disc 4, and contains a pair of hydraulic pistons (see FIG. 6) slidable in a direction parallel to the axis of rotation of the corresponding brake disc 4. When the pressure in an oil passage 23 formed by a hose or the like having a low coefficient of expansion is increased, these hydraulic pistons contained in each brake caliper 80 are slid in the opposite directions so as to come toward both surfaces of the corresponding brake disc 4. As a result, a pair of brake pads (see FIG. 6) provided between the hydraulic pistons in each brake caliper 80 and the corresponding brake disc 4 are pressed on both surfaces of this brake disc 4, so that a brake force is applied to the front wheel WF by the friction between the brake pads and this brake disc 4.

Mounted on a rear portion of the body frame 2 are a brake pedal 10 to be operated by the rider in producing a brake force for the rear wheel WR and a master cylinder 11 connected to the brake pedal 10. A brake disc 14 is connected to a wheel 15 of the rear wheel WR so as to rotate integrally with the wheel 15. A brake caliper 13 is mounted on the swing arm 9. A pair of hydraulic pistons (not shown) is contained in the brake caliper 13. When the pressure in an oil passage 12 is increased, the hydraulic pistons contained in the brake caliper 13 are slid in the opposite directions so as to come toward both surfaces of the brake disc 14. As a result, a pair of brake pads (not shown) is pressed on both surfaces of the brake disc 14, so that a brake force is applied to the rear wheel WR by the friction between the brake pads and the brake disc 14.

In this preferred embodiment, the oil pressure produced in the master cylinder 20 by the force input to the brake lever 21 by the rider is not directly transmitted to the brake calipers 80, but is input through an oil passage 22 into an oil passage selecting device 40. The oil passage 23 connected to the brake calipers 80 is connected to the oil passage selecting device 40, and a hydraulic modulator 60 is also connected through an oil passage 25 to the oil passage selecting device 40. The hydraulic modulator 60 is a device for producing an oil pressure by the drive force of an electric motor as an actuator. In the brake system according to this preferred embodiment, the source of generation of the oil pressure for operating the brake calipers 80 can be switched between the master cylinder 20 and the hydraulic modulator 60.

The installation position of the oil passage selecting device 40 and the hydraulic modulator 60 is not limited to the inside of the vehicle body in the vicinity of a fuel tank 7 as shown in FIG. 1, but may be set to an arbitrary position. For example, the oil passage selecting device 40 and the hydraulic modulator 60 may be installed at a front portion of the body frame 2. Further, the brake system including such a hydraulic modulator may be applied similarly to the rear wheel WR.

Figure 2:
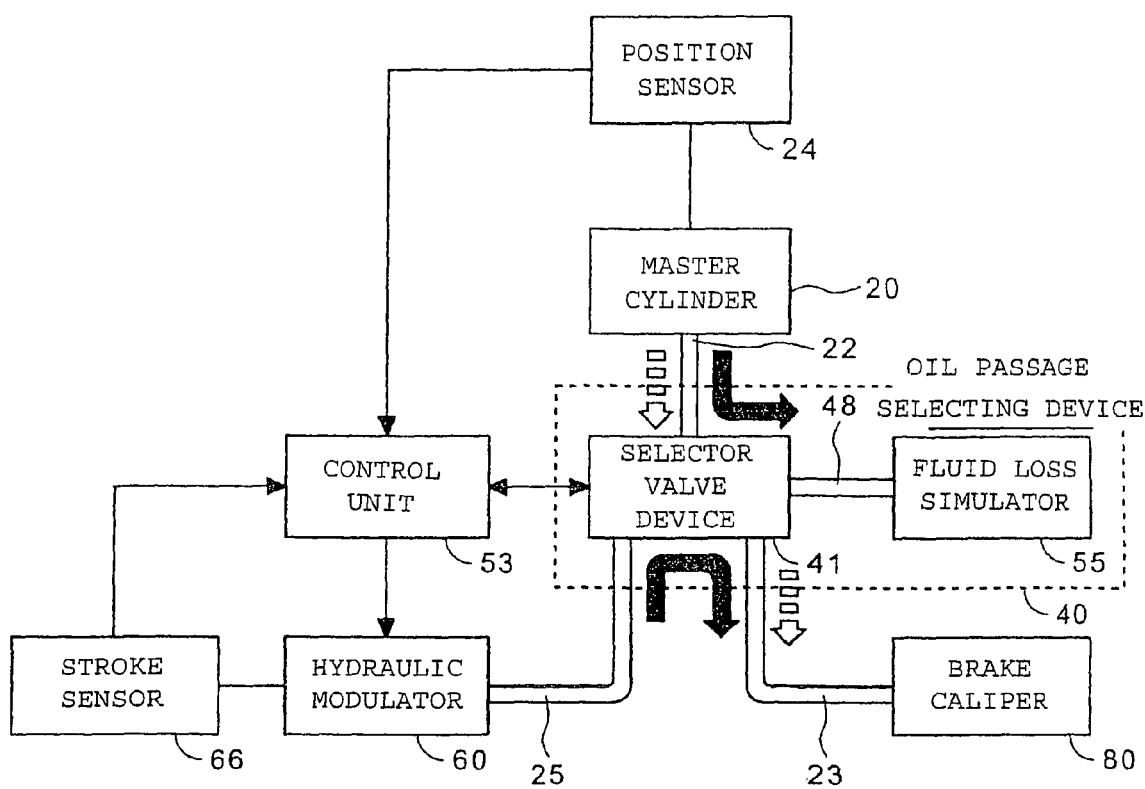
FIG. 2 is a block diagram showing the configuration of a brake system according to the first preferred embodiment.

FIG. 2 is a block diagram showing the configuration of the brake system according to the first preferred embodiment of the present invention. In FIG. 2, the same reference numerals as those shown in FIG. 1 denote the same or like parts. In the brake system according to this preferred embodiment, the oil pressure for operating the brake calipers 80 in normal running is entirely supplied from the hydraulic modulator 60, and only when a main switch is off or any trouble occurs in the brake system, the oil pressure produced in the master cylinder 20 by the rider directly operates the brake calipers 80.

The oil passage selecting device 40 is composed of a selector valve device 41 for switching the route of each oil passage and a fluid loss simulator 55 connected through an oil passage 48 to the selector valve device 41. A position sensor 24 for detecting a brake operation performed by the rider is mounted on the master cylinder 20. A control unit 53 is provided to transmit signals for driving the selector valve device 41 and the hydraulic modulator 60 according to information from the position sensor 24. The hydraulic modulator 60 generates an oil pressure according to a drive signal from the control unit 53 and supplies the oil pressure to the selector valve device 41. When the selector valve device 41 receives a drive signal from the control unit 53, the selector valve device 41 is driven to make the communication between the oil passages 22 and 48, thereby supplying the oil pressure from the master cylinder 20 to the fluid loss simulator 55. At the same time, the selector valve device 41 is driven to make the communication between the oil passages 25 and 23, thereby supplying the oil pressure from the hydraulic modulator 60 to the brake calipers 80.

With this configuration, when the brake lever 21 is operated by the rider in normal running, a brake force is applied to the front wheel WF by the oil pressure produced by the hydraulic modulator 60, and the oil pressure produced by the master cylinder 20 is used in the fluid loss simulator 55 for simultaneously giving the rider a resistance to the brake operation.

In the selector valve device 41 according to this preferred embodiment, the oil passage connected condition shown by the broken line arrows in FIG. 2 where the master cylinder 20 and the brake calipers 80 are directly connected to each other is set as a default (initial condition), and the oil passage selected condition shown by the solid line arrows in FIG. 2 is provided only when the brake operation is detected and the control unit 53 transmits the drive signals. Accordingly, even if any trouble occurs in the control unit 53 during running and the transmission of the drive signals from the control unit 53 is stopped, braking as in a normal brake system can be performed because the master cylinder 20 and the brake calipers 80 are directly connected to each other.

Further, the control unit 53 always monitors the condition of each part of the brake system by receiving response signals from electromagnetic valves built in the selector valve device 41 and an output signal from a stroke sensor 66 mounted on the hydraulic modulator 60. Accordingly, in the event that any trouble occurs in a part of the brake system, the drive signal from the control unit 53 to the selector valve device 41 is stopped.

Figure 3B:
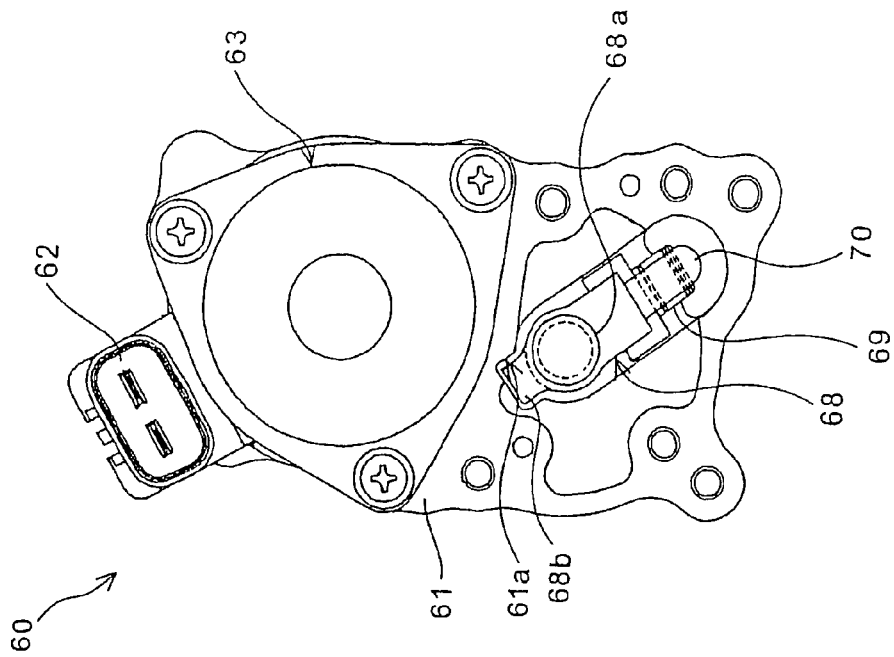
FIGS. 3(a) and 3(b) are side views of a hydraulic modulator according to the first preferred embodiment.
Figure 3A:
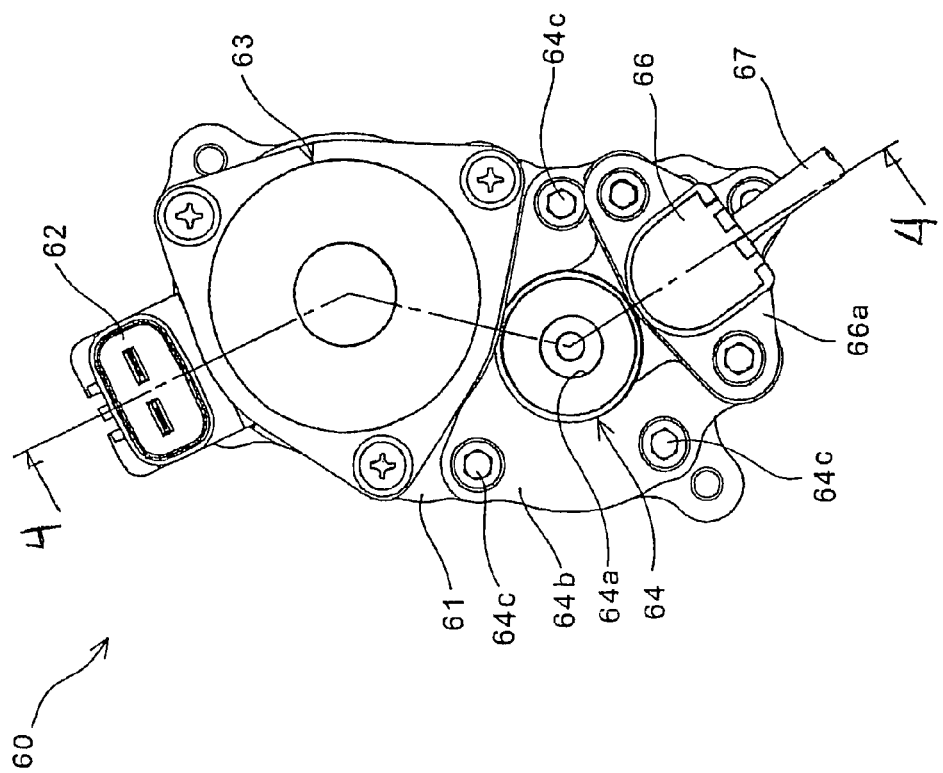

FIGS. 3(a) and 3(b) are side views of the hydraulic modulator 60 according to the first preferred embodiment of the present invention. The hydraulic modulator 60 includes a casing 61, a circular cylindrical electric motor 63 mounted on one side surface of the casing 61, and a circular cylindrical cylinder 64 as an oil pressure generating portion mounted on the one side surface of the casing 61 so as to be arranged adjacent to the electric motor 63. The cylinder 64 is formed at its one end with an oil bolt hole 64a for mounting the oil passage 25. The cylinder 64 integral with a base portion 64b is connected to the casing 61 by means of three mounting bolts 64c.

Further, the stroke sensor 66 for detecting the position and sliding speed of a power piston (see FIG. 4) slidably held in the cylinder 64 is mounted on the base portion 64b. The stroke sensor 66 is integrally formed with an extended stay 66a connected to the base portion 64b. A wiring cord 67 for transmitting sensor information to the control unit 53 is mounted on one end of the stroke sensor 66. A connector 62 for supplying an external drive power to the electric motor 63 is formed at an upper portion of the casing 61.

FIG. 3(b) shows a condition where the cylinder 64 and the stroke sensor 66 are removed from the casing 61. Provided in the vicinity of the bottom of the cylinder 64 are a push slider 68 for pushing the power piston, a push plate 70 connected to the push slider 68 for pushing a sensor rod (see FIG. 4) of the stroke sensor 66, and a cam follower 69 for connecting the push plate 70 to the push slider 68. The push slider 68 is formed with a head portion 68a having a substantially spherical surface. In the condition where the cylinder 64 is mounted, the spherical surface of the head portion 68a of the push slider 68 is in abutment against the central portion of the bottom surface of the power piston. Further, the push slider 68 is formed at its one end with a guide projection 68b engaged with a guide groove 61a formed on the casing 61 for maintaining the push slider 68 at a predetermined angle.

Figure 4:
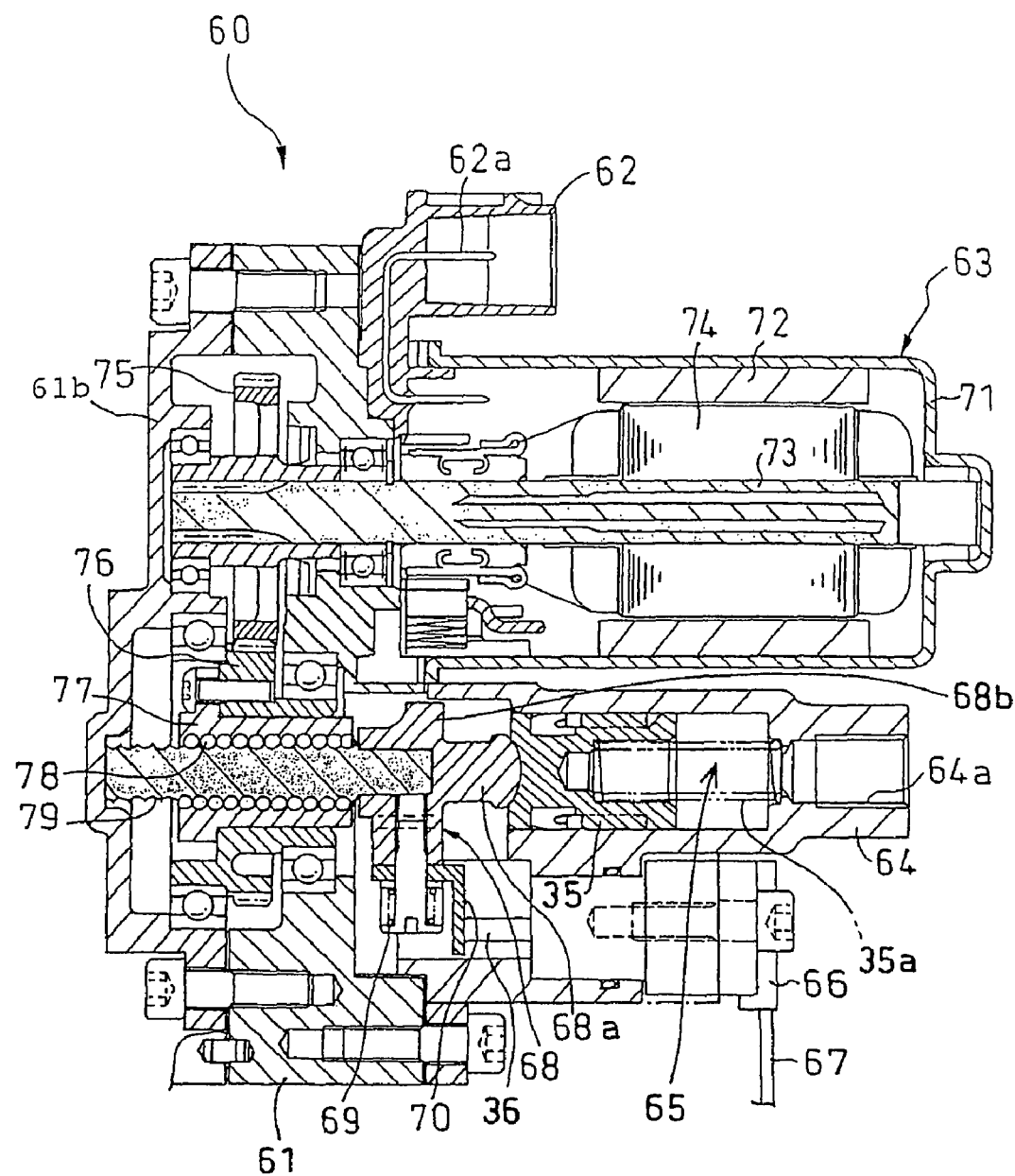
FIG. 4 is a cross section taken along the line 4-4 in FIG. 3(a)

FIG. 4 is a cross section taken along the line 4-4 in FIG. 3(a). In FIG. 4, the same reference numerals as those in FIGS. 1 to 3b denote the same or like parts. The electric motor 63 mounted on one side surface of the casing 61 so as to project therefrom is composed of a stator 72 connected to the inner wall of a motor cover 71 and a rotor 74 connected to a rotating shaft 73 as an output shaft. The electric motor 63 can be driven in an arbitrary rotational direction at an arbitrary rotational speed according to a drive signal from the control unit 53. The control unit 53 can transmit a drive signal considering the outputs from the position sensor 24 for detecting the operational condition of the brake lever 21 and from various sensors for detecting a vehicle speed, engine speed, gear position, etc. Provided in the connector 62 is a pole plate 62a connected to a wiring cord (not shown) for supplying a drive power to the electric motor 63.

A drive gear 75 is connected to one end portion of the rotating shaft 73 by splines, and a driven gear 76 is in mesh with the drive gear 75. A ball screw nut 77 having a spiral internal ball groove is integrally connected to the driven gear 76 so as to be fitted with the radially inside surface of the driven gear 76. The ball screw nut 77 is threadedly engaged with a ball screw shaft 79 having a spiral external ball groove through a plurality of balls 78. Accordingly, a rotational motion input to the ball screw nut 77 is converted into a linear motion of the ball screw shaft 79 in its axial direction. In the default condition where no drive power is supplied to the electric motor 63, the ball screw shaft 79 is maintained at a predetermined position where one end of the ball screw shaft 79 abuts against a back cover 61b connected to the back surface of the casing 61. Such a ball screw mechanism is capable of performing high-precision positioning control with low friction loss, so that drive control of the electric motor 63 can be converted into hydraulic control with high precision.

The push slider 68 having the head portion 68a is integrally connected to the other end portion of the ball screw shaft 79. The head portion 68a is in abutment against the central portion of the bottom surface of a power piston 35 slidably held in the cylinder 64. Accordingly, when the rotating shaft 73 of the electric motor 63 is rotationally driven in the clockwise or counterclockwise direction, the head portion 68a of the push slider 68 operates to push the power piston 35 in the rightward direction as viewed in FIG. 4, thereby pressurizing a brake fluid filling a hydraulic chamber 65. A return spring 35a for normally biasing the power piston 35 in the leftward direction as viewed in FIG. 4 is installed in the cylinder 64, so that the power piston 35 is normally pressed on the push slider 68.

Accordingly, even when a pushing force to the push slider 68 is intermittently input, there is no possibility that a gap may be produced between the head portion 68a and the power piston 35 to cause a delay of oil pressure increase time upon reinputting of the pushing force. Further, the contact surface of the head portion 68a to the bottom surface of the power piston 35 is a spherical surface, so that the inclination or misalignment of parts due to dimensional tolerance or the like can be absorbed by the spherical contact surface to thereby reduce friction and its related transmission loss of the pushing force of the push slider 68.

The cam follower 69 for fixing the push plate 70 to the push slider 68 is engaged with a groove (not shown) extending parallel to the ball screw shaft 79, thereby preventing the rotation of the ball screw shaft 79 and also functioning as a guide for the linear motion of the ball screw shaft 79 in its axial direction. The stroke sensor 66 for detecting the motion of the push slider 68 to thereby detect the sliding amount and sliding speed of the power piston 35 has a sensor rod 36 retractably projecting in one direction from the body of the sensor. The sensor rod 36 extends parallel to the cylinder 64. The sensor rod 36 is normally biased in its projecting direction by a spring or the like, so that the sensor rod 36 can repeat projection and retraction in association with a reciprocating motion of the push slider 68.

According to the hydraulic modulator 60 mentioned above, the ball screw mechanism is used to allow the parallel arrangement of the rotating shaft 73 of the electric motor 63 and the cylinder 64. Accordingly, the length of the rotating shaft 73 can be reduced and an unwanted space between the electric motor 63 and the cylinder 64 can be compressed. As compared with the conventional configuration such that a cylinder is provided on the axis of the rotating shaft of an electric motor or that a cylinder is arranged in perpendicular relationship with an electric motor, it is possible to obtain a compact hydraulic modulator suitable for use in a motorcycle. Further, by the use of the ball screw mechanism capable of performing high-precision positioning with low friction loss, it is possible to perform high-precision hydraulic control according to the drive control to the electric motor 63. Further, the stroke sensor 66 for detecting the sliding position and sliding speed of the power piston 35 extends in a direction parallel to the axis of the cylinder 64, which direction is the same as the direction of projection and retraction of the sensor rod 36, and the cylinder 64 and the stroke sensor 66 are set smaller in axial size than the electric motor 63, i.e., the right ends of the cylinder 64 and the stroke sensor 66 are axially retracted from the right end of the electric motor 63 as viewed in FIG. 4, thereby allowing a further reduction in size of the hydraulic modulator 60.

Figure 5:
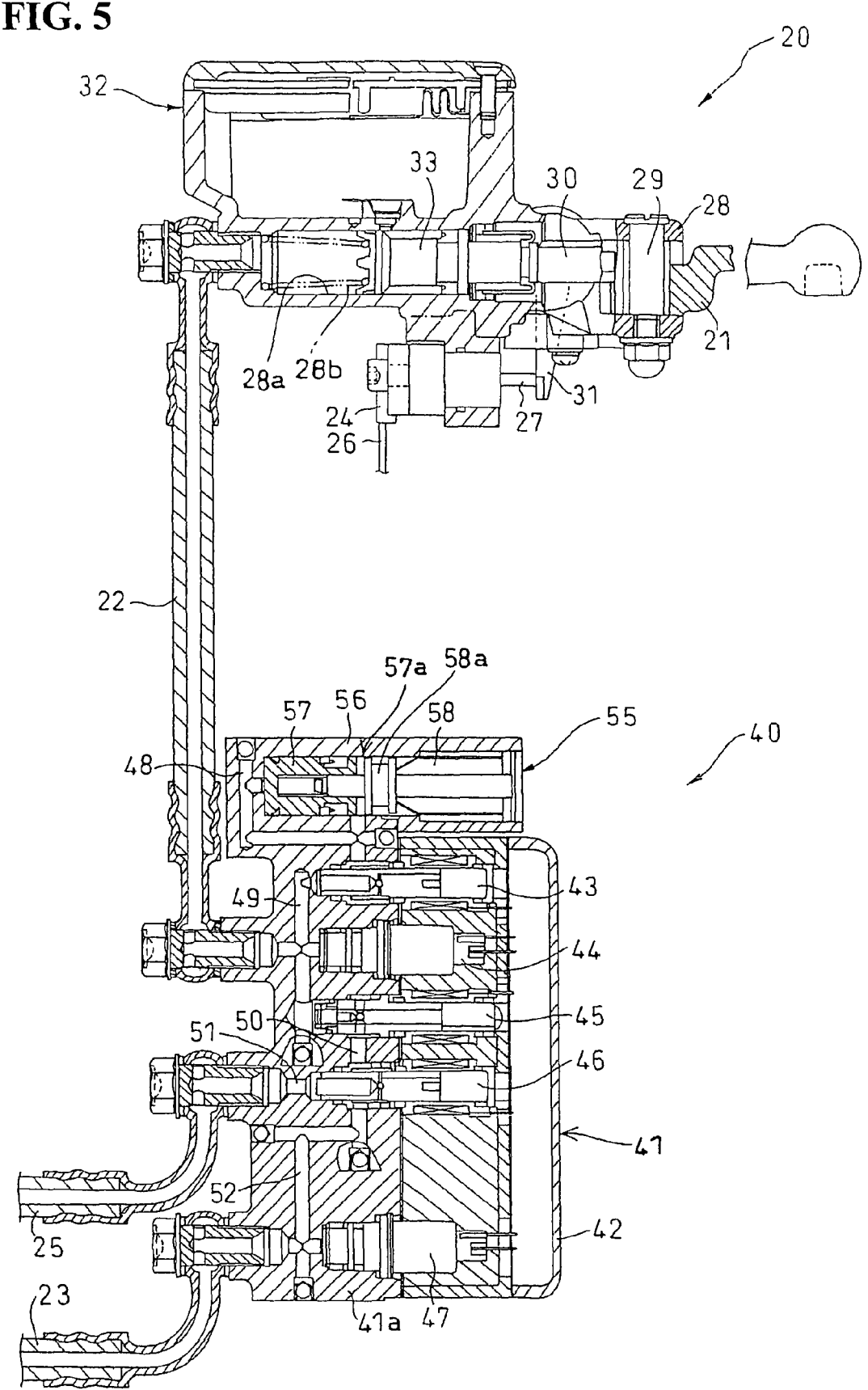
FIG. 5 is a sectional view of a master cylinder and an oil passage selecting device according to the first preferred embodiment.

FIG. 5 is a sectional view of the master cylinder 20 and the oil passage selecting device 40. The master cylinder 20 is a hydraulic pressure generator for pressurizing a brake fluid by receiving an operational force applied to the brake lever 21 by the rider. The brake lever 21 is pivotably supported through a pivot shaft 29 to a body portion 28 of the master cylinder 20. When the brake lever 21 is operated by the rider, a push projection 30 formed at one end of the brake lever 21 operates to slide a piston 33 slidably held in a cylinder 28a in the leftward direction as viewed in FIG. 5, thereby pressurizing the brake fluid filling the oil passage 22.

A return spring 28b is provided in the cylinder 28a so as to abut against the piston 33. The return spring 28b functions to bias the piston 33 in the rightward direction in the inoperative condition of the brake lever 21. The position sensor 24 for detecting the operational amount and operational speed of the brake lever 21 is mounted on the body portion 28. An extended portion 31 for pushing a sensor rod 27 of the position sensor 24 is formed in the vicinity of the push projection 30 of the brake lever 21. The extended portion 31 and the sensor rod 27 are capable of finely detecting an operational condition of the brake lever 21 by ensuring a large stroke. An output signal from the position sensor 24 is transmitted through a wiring cord 26 to the control unit 53 (see FIG. 2). Provided at an upper portion of the body portion 28 is a reservoir tank 32 open to the atmosphere for storing a reserve brake fluid to be added in the case that the amount of the brake fluid required in the oil passage increases because of the wearing of brake pads to be hereinafter described.

The brake fluid fed under pressure from the master cylinder 20 is input into the oil passage selecting device 40 including the fluid loss simulator 55 and the selector valve device 41. The selector valve device 41 has a body 41a formed with a plurality of oil passages. The body 41a is provided with three electromagnetic selector valves (first electromagnetic selector valve 43, second electromagnetic selector valve 45, and third electromagnetic selector valve 46) for switching the open and closed conditions of the oil passages according to the drive signal from the control unit 53. The first electromagnetic selector valve 43 functions to open and close oil passages 48 and 49. The second electromagnetic selector valve 45 functions to open and close oil passages 49 and 50. The third electromagnetic selector valve 46 functions to switch the routes of oil passages 50, 51, and 52. An input pressure sensor 44 is provided in the oil passage 49, and an output pressure sensor 47 is provided in the oil passage 52.

The first electromagnetic selector valve 43 and the third electromagnetic selector valve 46 are in a closed condition as a default condition, and the second electromagnetic selector valve 45 is in an open condition as a default condition. Accordingly, in the default condition, the oil passage from the master cylinder 20 to the brake calipers 80 is routed through the oil passage 22, the oil passage 49, the oil passage 50, the oil passage 52 and the oil passage 23 in this order. In contrast, when the brake operation is performed and the drive signal is transmitted from the control unit 53, the first electromagnetic selector valve 43 and the third electromagnetic selector valve 46 are opened and the second electromagnetic selector valve 45 is closed. As a result, the oil passages 49 and 50 are closed and the oil passages 49 and 48 come into communication with each other, so that the oil pressure from the master cylinder 20 is input into the fluid loss simulator 55. Further, the oil passages 51 and 52 come into communication with each other, so that the oil pressure input from the hydraulic modulator 60 (see FIG. 4) through the oil passage 25 into the oil passage selecting device 40 is output from the oil passage 23. The control unit 53 always monitors the condition of the oil passage selecting device 40 by receiving signals from each electromagnetic selector valve and each pressure sensor, thereby instantaneously detecting any trouble in the oil passage selecting device 40.

As mentioned above, the fluid loss simulator 55 is a device for simultaneously giving the rider a resistance to the brake operation by using the oil pressure input from the master cylinder 20 while the operation of the brake calipers 80 is being performed by the oil pressure generated from the hydraulic modulator 60. The fluid loss simulator 55 has a cylinder 56 and a second piston 57 slidably held in the cylinder 56. The second piston 57 is slidable according to the oil pressure input from the oil passage 48. A second piston rod 58a is relatively movably provided on the right side of the second piston 57 as viewed in FIG. 5, and a deformable resin repulsive member 58 is connected to one end portion of the second piston rod 58a. A set spring (see FIG. 7) is provided between the second piston 57 and the second piston rod 58a so as to bias them in the axially opposite directions. Accordingly, when no oil pressure is input from the oil passage 48, a predetermined gap 57a is defined between the second piston 57 and the second piston rod 58a.

Figure 6:
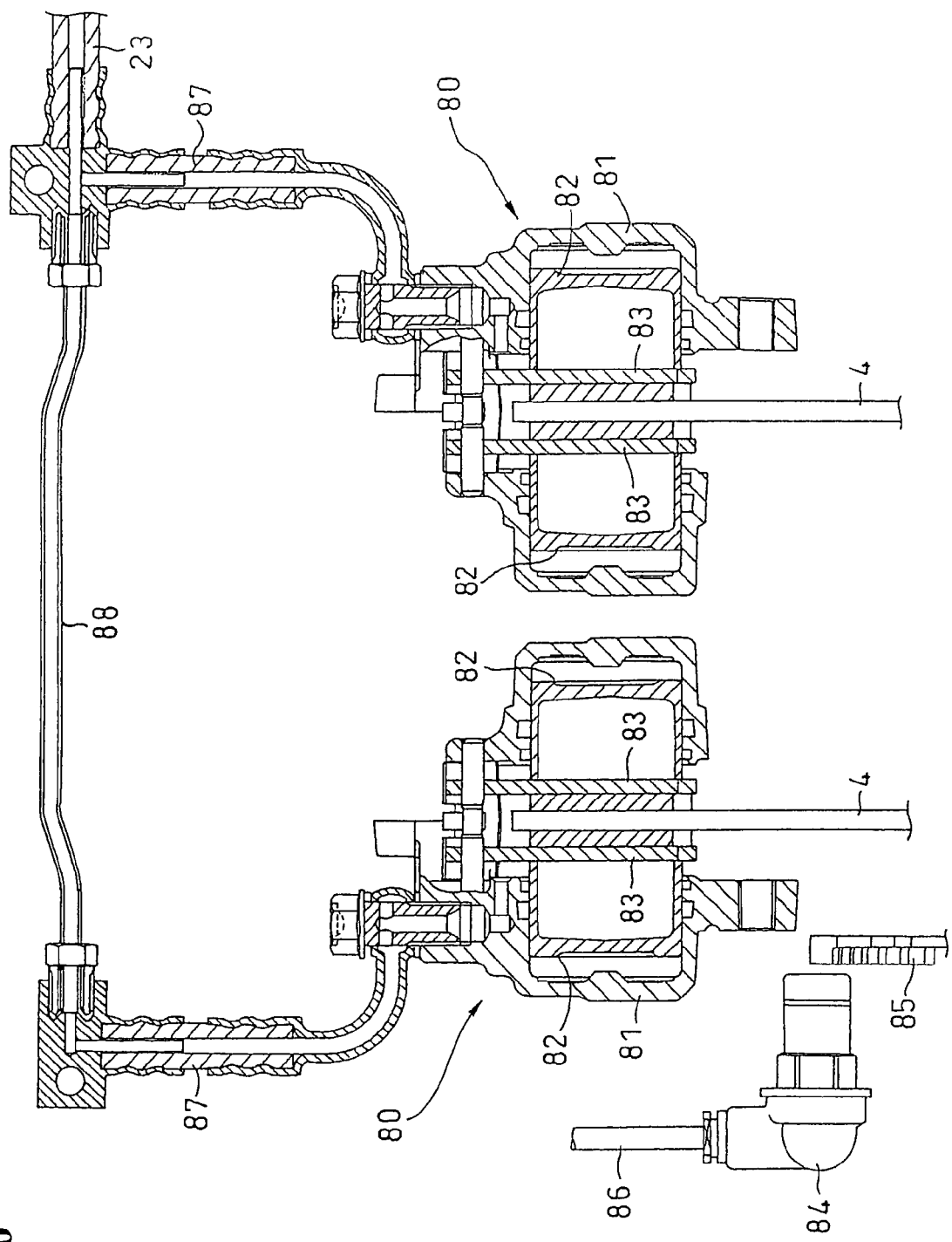
FIG. 6 is a sectional view of brake calipers according to the first preferred embodiment.

FIG. 6 is a sectional view of the brake calipers 80. The oil pressure transmitted from the master cylinder 20 or the hydraulic modulator 60 through the oil passage 23 is distributed to the right and left sides by an oil passage 88 formed from a steel pipe and is then supplied through a pair of oil passages 87 to the right and left brake calipers 80. Each brake caliper 80 has a body portion 81 and a pair of hydraulic pistons 82 slidably held in the body portion 81. The hydraulic pistons 82 are slidable in the opposite directions so as to sandwich the corresponding brake disc 4. When the oil pressure from the oil passage 87 connected to each brake caliper 80 is transmitted to the corresponding hydraulic pistons 82, a pair of brake pads 83 formed of sintered metal or the like is pressed on both surfaces of the corresponding brake disc 4 formed of stainless steel, thereby generating a frictional force between the brake disc 4 and each brake pad 83. Further, a vehicle speed sensor 84 for detecting a vehicle speed of the motorcycle 1 is mounted on the front wheel WF. The vehicle speed sensor 84 has a large-diameter pulser ring 85 rotating with the front wheel WF as a detected member, so that the vehicle speed sensor 84 can detect the rotational condition of the front wheel WF every minute rotational angle.

Figure 7:
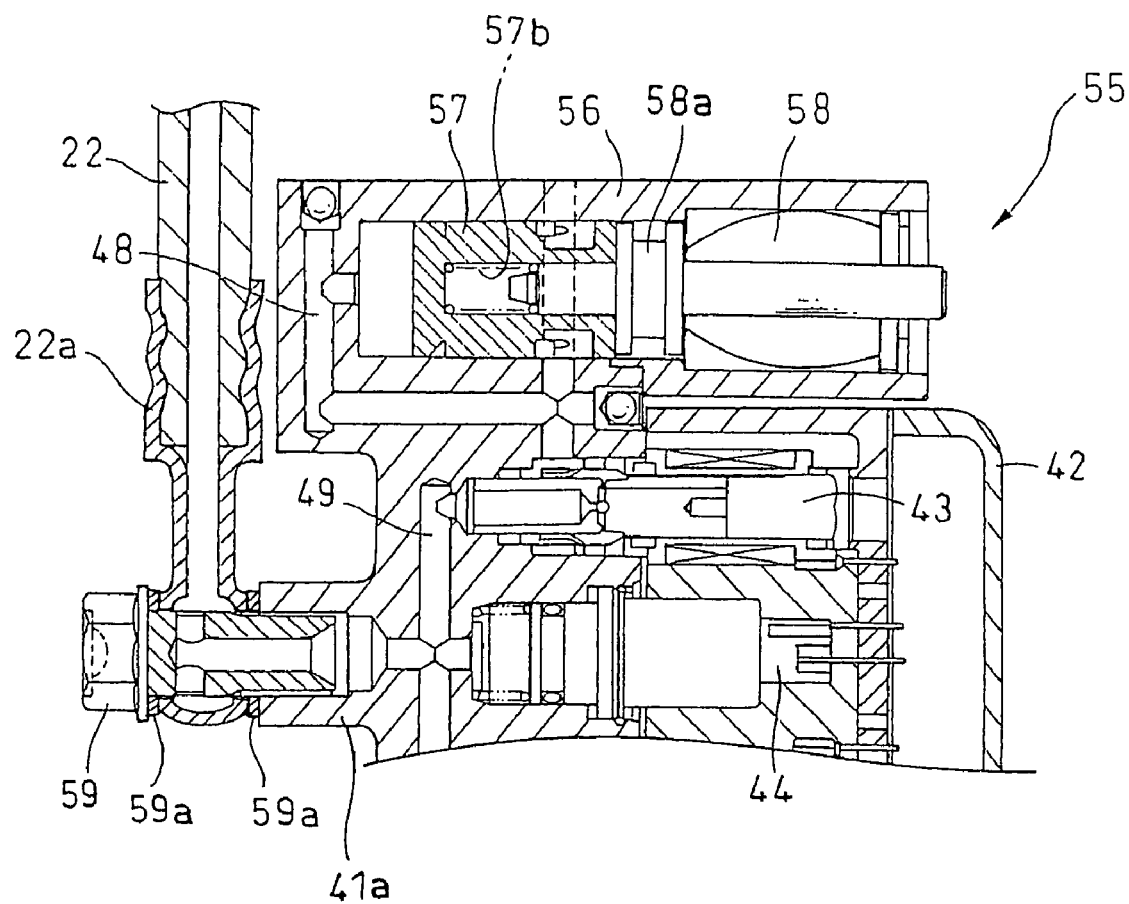
FIG. 7 is a sectional view showing an operative condition of a fluid loss simulator according to the first preferred embodiment.

FIG. 7 is a sectional view showing an operative condition of the fluid loss simulator 55. Until the second piston 57 comes into abutment against the second piston rod 58a by the oil pressure from the master cylinder 20, only the repulsive force of the set spring 57b is produced in the brake lever 21. After the second piston 57 abuts against the second piston rod 58a, the deformable resin repulsive member 58 as an elastic member must be deformed to further slide the second piston 57 as shown in FIG. 7. Accordingly, it is possible to obtain a resistance as in a normal brake system such that the resistance is small in the initial stage of the stroke of the brake lever 21 and thereafter gradually increases like a quadratic curve. A connecting member 22a formed of metal is connected by crimping to an end portion of the oil passage 22 formed from a bendable hose having a low coefficient of expansion. An oil bolt 59 is inserted through the connecting member 22a and is tightened through a sealing washer 59a to the body 41a, thereby making the communication between the oil passages 22 and 49.

Figure 8:
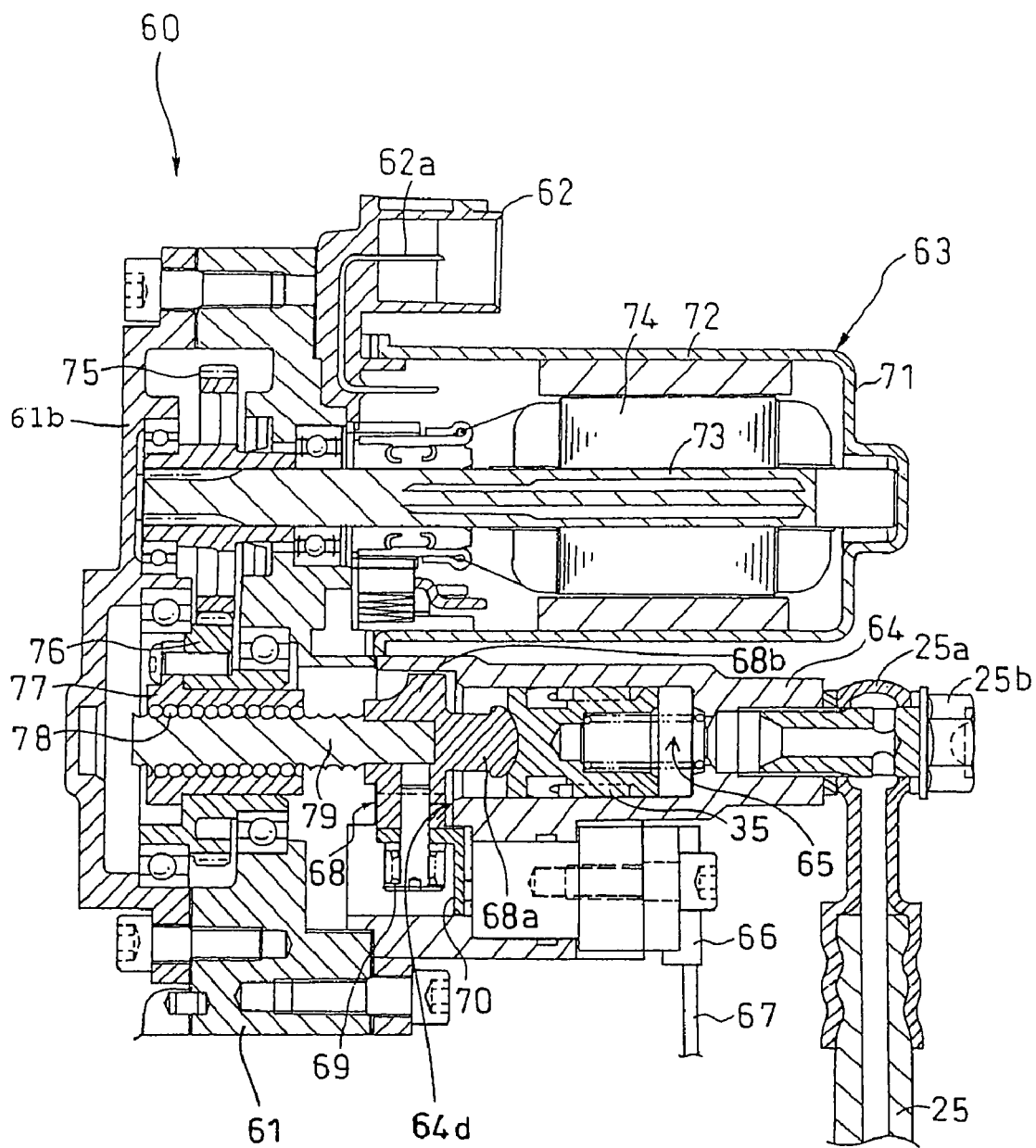
FIG. 8 is a sectional view showing an operative condition of the hydraulic modulator shown in FIG. 4.

FIG. 8 is a sectional view showing an operative condition of the hydraulic modulator 60. In FIG. 8, the same reference numerals as those shown in FIGS. 1 to 7 denote the same or like parts. In the condition shown in FIG. 8, the power piston 35 is slid to a maximum stroke position by the drive force of the electric motor 63 to exhibit a maximum oil pressure by the hydraulic modulator 60. At the maximum stroke position of the power piston 35, the push slider 68 moved rightward by the ball screw nut 77 comes into abutment against a stopper surface 64d formed at the left end of the cylinder 64 as viewed in FIG. 8. Accordingly, even when any trouble occurs in the drive signal to the electric motor 63, it is possible to prevent a problem such that an excessive oil pressure greater than a predetermined value may be produced in the hydraulic chamber 65.

A connecting member 25a is connected by crimping to an end portion of the oil passage 25 formed from a bendable hose having a low coefficient of expansion, which hose is formed of synthetic resin or the like. The connecting member 25a is tightened by an oil bolt 25b to an end portion of the cylinder 64. The oil pressure obtained by the power piston 35 is transmitted through the oil passage 25 to the oil passage selecting device 40. The hydraulic modulator 60 according to this preferred embodiment is suitable for use with an antilock brake system (ABS) for avoiding wheel locking upon braking by intermittently reducing the oil pressure produced in an oil passage. More specifically, when wheel locking is detected by the vehicle speed sensor 84 mounted on the front wheel WF, the electric motor 63 is reversely driven to thereby reduce the oil pressure in the oil passage 25. Accordingly, as compared with a method of reducing the oil pressure in an oil passage by operating a pressure reducing valve provided in the oil passage, the brake system according to this preferred embodiment can eliminate the need for such a pressure reducing valve and a dedicated oil passage, thus simplifying the overall structure. Further, pulsation due to the intermittent pressure reduction upon operation of the ABS is not transmitted to the master cylinder 20, so that vibrations due to the pulsation are not produced in the brake lever 21. The configuration of the ABS as mentioned above is applicable also to the rear wheel WR.

Further, the hydraulic modulator 60 according to this preferred embodiment is also suitable for use with a front and rear interlocked brake system for automatically distributing a braking force to the front and rear wheels according to a vehicle running condition such as a vehicle speed. By providing a hydraulic modulator for the front wheel and a hydraulic modulator for the rear wheel, the braking forces to be produced in the front and rear wheels can be individually controlled. For example, the braking forces can be produced in the front and rear wheels at an optimum ratio by the operation of a brake lever only, or the ratio between the braking forces in the front and rear wheels can be changed according to a vehicle speed.

The ABS and the front and rear interlocked brake system as mentioned above can be applied in combination. Also in this case, it is unnecessary to provide any dedicated brake calipers and piping, but the hydraulic modulator and the oil passage selecting device according to the present invention can be inserted in an oil passage of a normal brake system.

The configuration of the ball screw mechanism used in the hydraulic modulator, the configuration of the power transmitting mechanism between the rotating shaft of the electric motor and the ball screw shaft, the shapes of the push slider and the power piston, etc. are not limited to those mentioned in the above preferred embodiment, but various modifications may be made.

Figure 9:
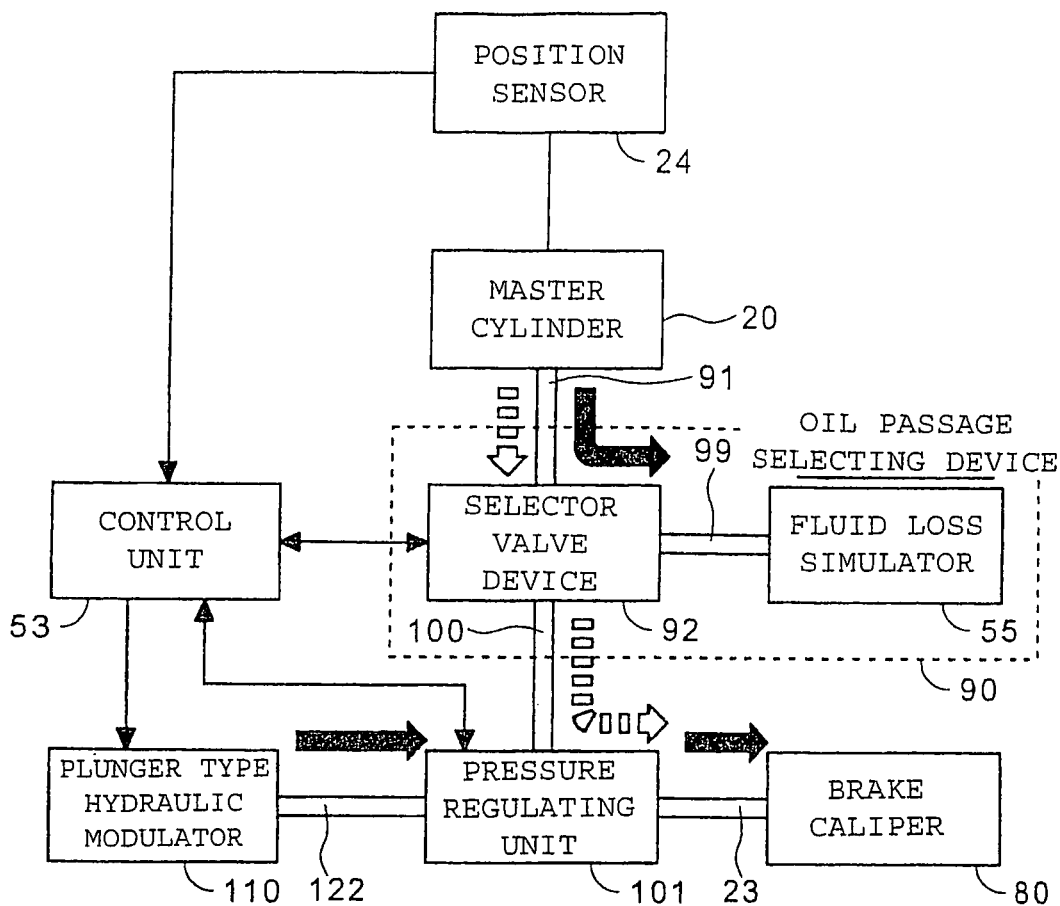
FIG. 9 is a block diagram showing the configuration of a brake system using a plunger type hydraulic modulator according to a second preferred embodiment of the present invention.

FIG. 9 is a block diagram showing the configuration of a brake system using a plunger type hydraulic modulator 110 according to a second preferred embodiment of the present invention. In FIG. 9, the same reference numerals as those shown in FIGS. 1 to 8 denote the same or like parts. In the brake system according to this preferred embodiment, the oil pressure for operating the brake calipers 80 in normal running is entirely supplied from the plunger type hydraulic modulator 110. An oil passage selecting device 90 is composed of a selector valve device 92 for switching the route of each oil passage and a fluid loss simulator 55 connected through an oil passage 99 to the selector valve device 92. A position sensor 24 for detecting a brake operation by the rider is mounted on the master cylinder 20. A control unit 53 is provided to transmit signals for driving the selector valve device 92, a pressure regulating unit 101, and the plunger type hydraulic modulator 110 according to information from the position sensor 24. The plunger type hydraulic modulator 110 supplies a necessary oil pressure to the pressure regulating unit 101 according to a drive signal from the control unit 53. Upon receiving a drive signal from the control unit 53, the selector valve device 92 makes the communication between oil passages 91 and 99 to thereby supply the oil pressure from the master cylinder 20 to the fluid loss simulator 55. The pressure regulating unit 101 supplies to the brake calipers 80 the oil pressure supplied from the plunger type hydraulic modulator 110 through an oil passage 122. Also in this brake system, the oil passage connected condition shown by the broken line arrows in FIG. 9 where the master cylinder 20 and the brake calipers 80 are directly connected to each other is set as a default, and the oil passage selected condition shown by the solid line arrows in FIG. 9 is provided only when the brake operation is performed and the control unit 53 transmits the drive signals.

Figure 10:
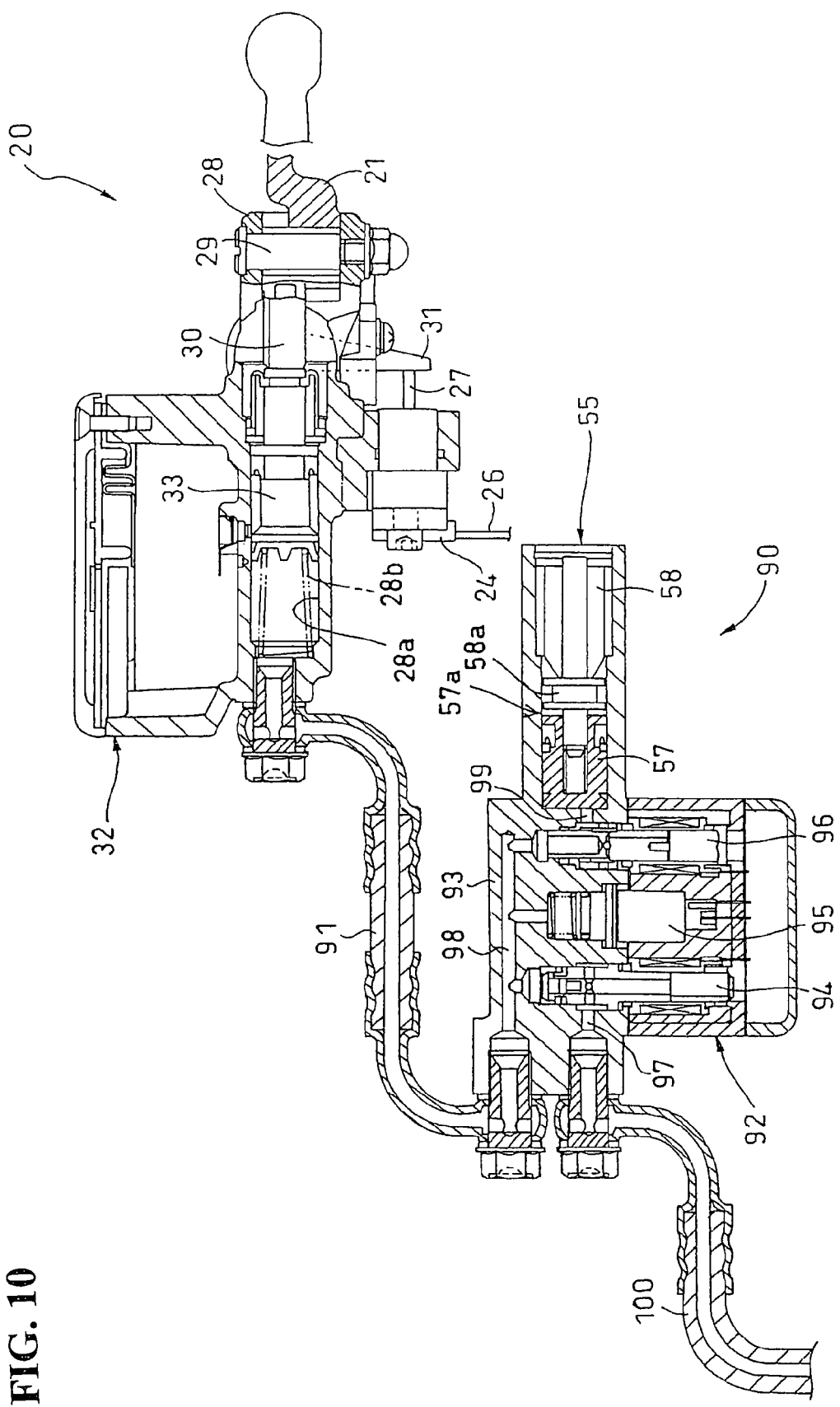
FIG. 10 is a sectional view of a master cylinder and an oil passage selecting device according to the second preferred embodiment.

FIG. 10 is a sectional view of the master cylinder 20 and the oil passage selecting device 90. In FIG. 10, the same reference numerals as those shown in FIGS. 1 to 9 denote the same or like parts. The master cylinder 20 is a hydraulic pressure generator for pressurizing a brake fluid by the operation of the brake lever 21 by the rider. The configuration of the master cylinder 20 is the same as that in the first preferred embodiment. The oil pressure transmitted from the master cylinder 20 is input into the oil passage selecting device 90 including the fluid loss simulator 55 and the selector valve device 92. The selector valve device 92 has a body 93 formed with a plurality of oil passages. The body 93 is provided with a first electromagnetic selector valve 94 and a second electromagnetic selector valve 96 for switching the open and closed conditions of the oil passages according to a drive signal from the control unit 53. The first electromagnetic selector valve 94 functions to open and close oil passages 97 and 98. The second electromagnetic selector valve 96 functions to open and close oil passages 98 and 99. An input pressure sensor 95 is provided in the oil passage 98.

In the default condition where no brake operation is performed, the first electromagnetic selector valve 94 is in an open condition and the second electromagnetic selector valve 96 is in a closed condition. Accordingly, in the default condition, the oil passage from the master cylinder 20 to the pressure regulating unit 101 is routed through the oil passage 91, the oil passage 98, the oil passage 97 and the oil passage 100 in this order. In contrast, when the brake operation is performed and the drive signal is transmitted from the control unit 53, the first electromagnetic selector valve 94 is closed and the second electromagnetic selector valve 96 is opened. As a result, the oil passages 97 and 98 are closed and the oil passages 93 and 99 come into communication with each other, so that the oil pressure from the master cylinder 20 is input into the fluid loss simulator 55.

Figure 11:
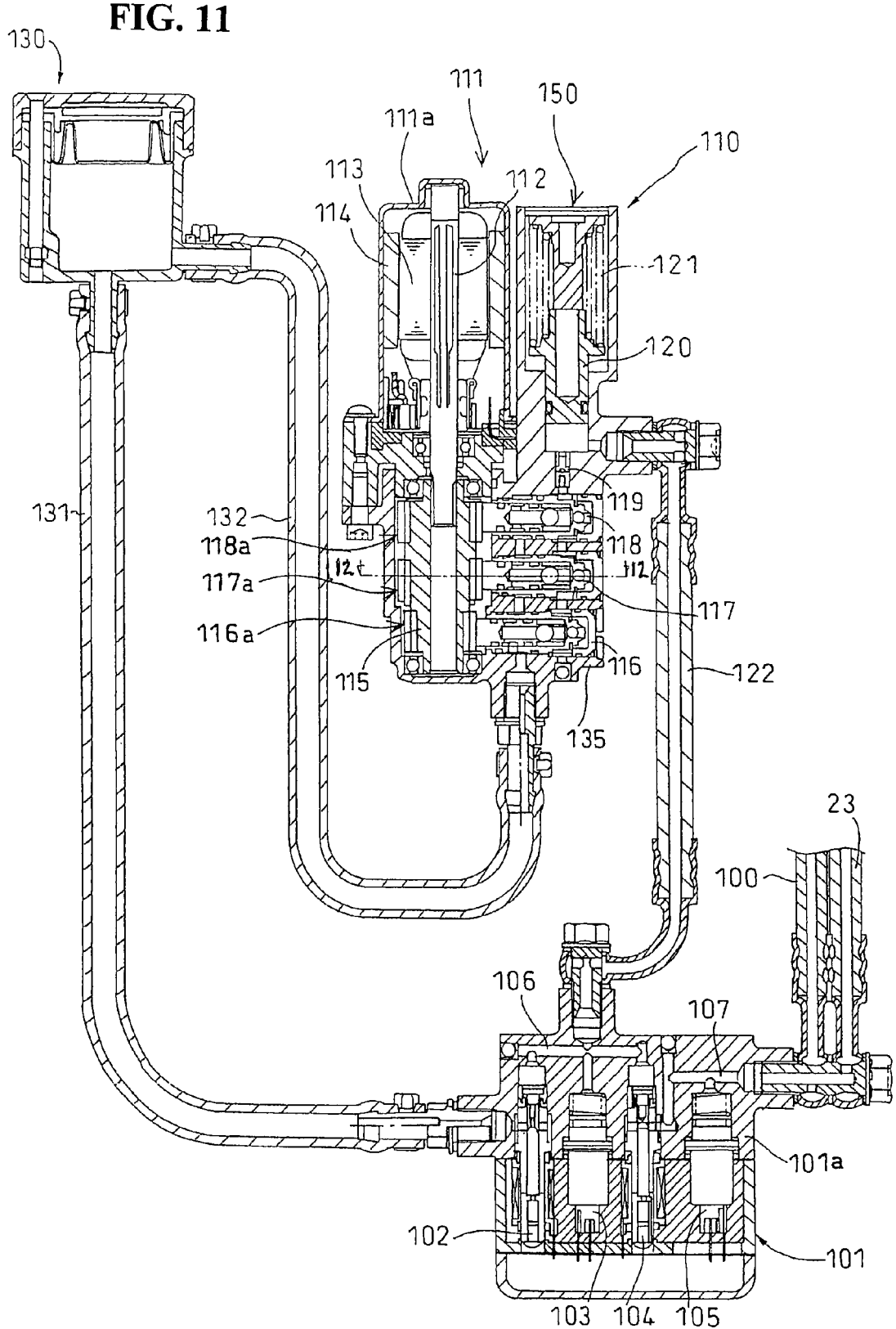
FIG. 11 is a sectional view of the plunger type hydraulic modulator and a pressure regulating unit according to the second preferred embodiment.

FIG. 11 is a sectional view of the plunger type hydraulic modulator 110 and the pressure regulating unit 101. In FIG. 11, the same reference numerals as those shown in FIGS. 1 to 10 denote the same or like parts. The plunger type hydraulic modulator 110 includes an electric motor 111 composed of a stator 114 connected to the inner wall of a motor cover 111a and a rotor 113 connected to a rotating shaft 112. The electric motor 111 is driven at an arbitrary rotational speed according to a drive signal from the control unit 53. Provided in a casing 135 are a plurality of plunger pumps 116, 117, and 118 for intermittently feeding the brake fluid by a reciprocating motion. An eccentric cam 115 having three cam portions is mounted on the rotating shaft 112 of the electric motor 111.

Three roller bearings 116a, 117a, and 118a such as needle bearings are respectively engaged with the three cam portions of the eccentric cam 115, thereby avoiding direct sliding contact between the plunger pumps 116, 117, and 118 and the cam surfaces of the respective cam portions to reduce a transmission loss of the drive force. Further, the plunger pumps 116, 117, and 118 extend parallel to each other in a direction perpendicular to the axis of the eccentric cam 115, and the three cam portions are formed so that the plunger pumps 116, 117, and 118 are operated at 120° intervals per rotation of the rotating shaft 112. The cam portion formed at the lower end of the eccentric cam 115 has a diameter smaller than that of each of the other two cam portions, so that the roller bearing 116a has a diameter smaller than that of each of the roller bearings 117a and 118a. The reason for this setting is to facilitate the mounting of the eccentric cam 115 in inserting the eccentric cam 115 into the casing 135 from the upper side thereof as viewed in FIG. 11.

As compared with a method of operating a plunger pump once per rotation of an eccentric cam, oil pressure pulsation in the oil passage can be greatly reduced according to the configuration shown in FIG. 11. As a method of sequentially operating three plunger pumps at 120° intervals per rotation of the rotating shaft, it is considered to radially extend the three plunger pumps from one eccentric cam at 120° intervals. However, as compared with this configuration, the configuration shown in FIG. 11 has an advantage such that the oil passage can be linearly formed to thereby simplify the structure of the plunger type hydraulic modulator 110. Further, a dead space formed between any adjacent ones of the radially extending plunger pumps can be compressed to thereby obtain the compact plunger type hydraulic modulator 110 suitable for use in a motorcycle.

The plunger type hydraulic modulator 110 includes an accumulator 150 having a piston 120 normally biased by a return spring 121. The brake fluid fed under pressure by the plunger pumps 116, 117, and 118 is supplied through an oil passage 119 having a check valve into the accumulator 150, so that a predetermined oil pressure is always maintained in the accumulator 150 and in an oil passage 122 communicating with the pressure regulating unit 101. Thus, the accumulator 150 functions to accumulate this predetermined oil pressure so that this oil pressure can be immediately supplied when a drive signal is input into the electric motor 111, so as to eliminate a delay from the time of inputting the drive signal to the time of transmitting the oil pressure to the brake calipers 80. The accumulator 150 has a substantially cylindrical shape and extends parallel to the rotating shaft 112 of the electric motor 111, thereby realizing a further reduction in size of the plunger type hydraulic modulator 110.

The oil pressure transmitted from the plunger type hydraulic modulator 110 is supplied through the oil passage 122 into the pressure regulating unit 101. The pressure regulating unit 101 has a body 101a formed with a plurality of oil passages. The body 101a is provided with a first electromagnetic linear pressure regulating valve 102 and a second electromagnetic linear pressure regulating valve 104 as pressure regulating valves for maintaining a set pressure according to a drive signal from the control unit 53. The first electromagnetic linear pressure regulating valve 102 performs pressure regulation between oil passages 106 and 131, and the second electromagnetic linear pressure regulating valve 104 performs pressure regulation between oil passages 106 and 107. Further, an oil pressure sensor 103 for detecting the oil pressure in the oil passage 106 is provided between the first and second electromagnetic linear pressure regulating valves 102 and 104, and an output pressure sensor 105 is provided in the oil passage 107.

In the default condition where no brake operation is performed, the first electromagnetic linear pressure regulating valve 102 performs pressure regulation and the second electromagnetic linear pressure regulating valve 104 is in a closed condition. Accordingly, in the default condition, the oil passage from the master cylinder 20 to the brake calipers 80 is routed through the oil passage 100 and the oil passage 23 in this order. Further, the oil pressure generated in the plunger type hydraulic modulator 110 is maintained at a predetermined pressure by the pressure regulation of the first electromagnetic linear pressure regulating valve 102 in the range from the accumulator 150 through the oil passage 122 to the oil passage 106. When the electric motor 111 is operated to maintain the oil pressure in the accumulator 150, the brake fluid is added from a reserve tank 130 open to the atmosphere through an oil passage 132 to the plunger type hydraulic modulator 110.

In contrast, when the brake operation is performed and the drive signal is transmitted from the control unit 53, the first electromagnetic linear pressure regulating valve 102 is closed and the second electromagnetic linear pressure regulating valve 104 performs pressure regulation, thereby transmitting the predetermined oil pressure to the brake calipers 80. Since the oil passage between the oil passage 100 and the master cylinder 20 is closed by the first electromagnetic selector valve 94 (see FIG. 10), the oil pressure transmitted through the oil passage 107 is supplied through the oil passage 23 to only the brake calipers 80.

Figure 12:
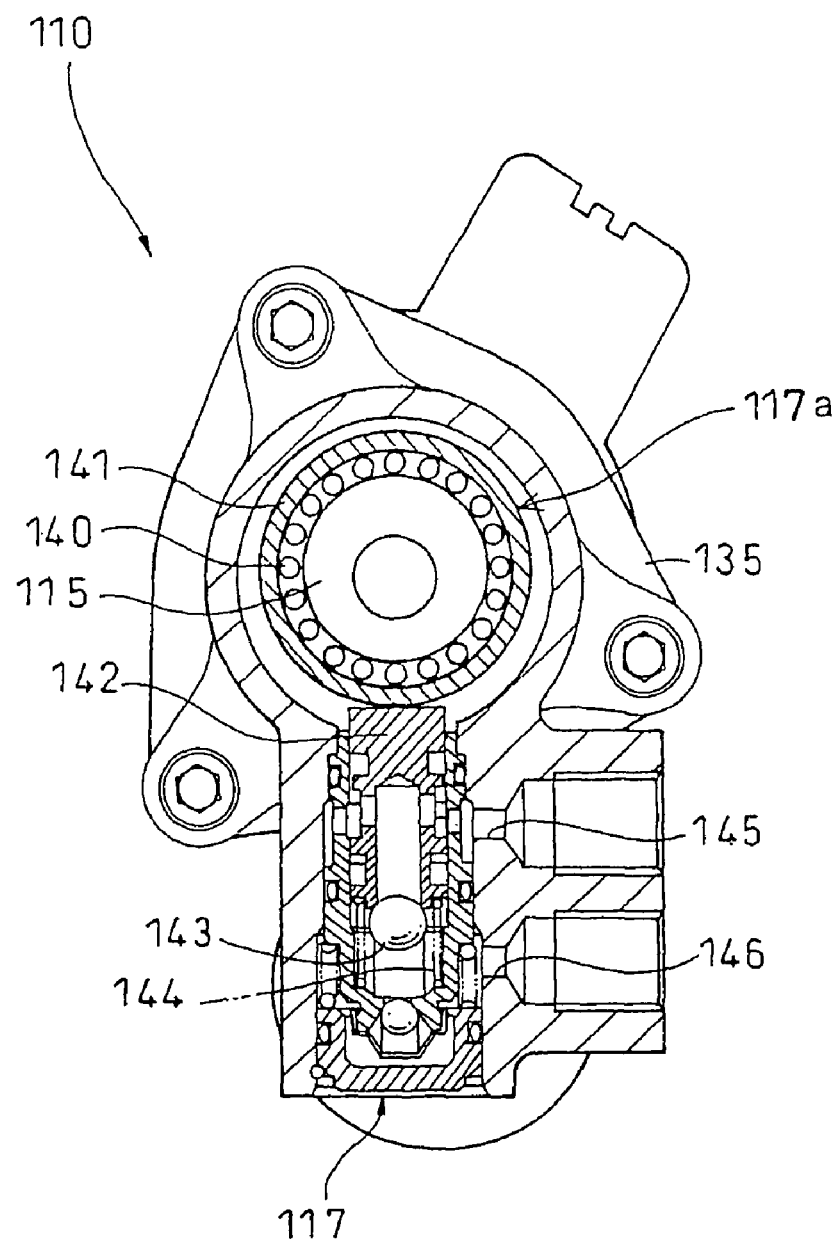
FIG. 12 is a cross section taken along the line 12-12 in FIG. 11.

FIG. 12 is a cross section taken along the line 12-12 in FIG. 11. The roller bearing 117a engaged with the eccentric cam 115 is composed of a plurality of needles 140 and an outer ring 141. A spool valve 142 reciprocatable in a direction perpendicular to the axial direction of the eccentric cam 115 is accommodated in an outer cylindrical portion of the cylindrical plunger pump 117. The spool valve 142 is normally biased toward the eccentric cam 115 by a return spring 144. With the rotational drive of the electric motor 111, the spool valve 142 is reciprocated to suck the brake fluid from a suction port 145 communicating with the oil passage 132 and to intermittently discharge the brake fluid from a discharge port 146 communicating with the oil passage 119 by the operation of a ball valve 143.

According to the plunger type hydraulic modulator as mentioned above, the three plunger pumps are driven by the eccentric cam having the three cam portions for providing different discharge timings, thereby reducing oil pressure pulsation. Further, the three plunger pumps extend parallel to each other in a direction perpendicular to the rotating shaft of the electric motor. Accordingly, the frontal projected area of the plunger type hydraulic modulator can be reduced to obtain a compact structure. Further, the oil passage formed in the body of the modulator can be simplified to thereby simplify a production process. Like the hydraulic modulator 60 according to the first preferred embodiment, the plunger type hydraulic modulator 110 is suitable for use with an ABS and/or a front and rear interlocked brake system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic modulator for a brake device comprising:
a cylinder for slidably supporting a piston and changing the volume of a hydraulic chamber communicating with a brake caliper according to the sliding of said piston; and
a motor for sliding said piston through power transmitting means;
said power transmitting means being arranged so that said cylinder extends parallel to a rotating shaft of said motor;
wherein said power transmitting means includes a push slider for pushing the piston,
the push slider having a convex end part shaped as an outer portion of part of a sphere, and
the piston having a concave end part shaped as an inner portion of part of a sphere,
the convex end part of the push slider being in direct spherical contact with the concave end part of the piston, and
a rotational motion of said motor being converted into a linear motion of the push slider on an axis parallel to said rotating shaft,
wherein a radially extending guide projection is formed on one side of the push slider, the guide projection being fitted into an axially extending groove so that the push slider is movable within the hydraulic modulator only in an axial direction of the push slider, and
wherein a push plate is connected to the push slider on a side opposite to where the guide projection is formed.

2. The hydraulic modulator for a brake device according to claim 1,
said hydraulic modulator further including a stroke sensor having a sensor rod retractably supported for detecting the position of said push slider;
said stroke sensor being arranged so that said sensor rod extends parallel to said cylinder.

3. The hydraulic modulator for a brake device according to claim 2, wherein said cylinder and said stroke sensor are set smaller in axial size than an axial size of said motor.

4. The hydraulic modulator for a brake device according to claim 1, wherein said power transmitting means comprises a ball screw mechanism for converting the rotational motion to the linear motion.

5. The hydraulic modulator for a brake device according to claim 2, wherein said power transmitting means comprises a ball screw mechanism for converting the rotational motion to the linear motion.

6. The hydraulic modulator for a brake device according to claim 3, wherein said power transmitting means comprises a ball screw mechanism for converting the rotational motion to the linear motion.

7. The hydraulic modulator for a brake device according to claim 4, wherein the ball screw mechanism includes a ball screw nut, balls, and a ball screw shaft.

8. The hydraulic modulator for a brake device according to claim 2, wherein the rotating shaft extends lengthwise in an axial direction beyond both ends of the cylinder and both ends of the push slider of the power transmitting means.

9. The hydraulic modulator for a brake device according to claim 2, wherein the push plate is connected to the push slider in order to push on a free end the retractable sensor rod, and moving the free end of the sensor rod closer to the stroke sensor during the linear motion of the push slider toward the piston.

10. The hydraulic modulator for a brake device according to claim 2, further comprising a return spring installed in the cylinder, the return spring being adapted to constantly bias the piston against the push slider.

11. A hydraulic modulator for a brake device comprising:
a casing;
a cylinder for slidably supporting a piston and changing the volume of a hydraulic chamber communicating with a brake caliper according to the sliding of said piston; and
a motor for sliding said piston through power transmitting means;
said power transmitting means being arranged so that said cylinder extends parallel to a rotating shaft of said motor;
wherein said power transmitting means includes a push slider for pushing the piston, the push slider having an convex end part shaped as an outer portion of part of a sphere, and the piston having an concave end part shaped as an inner portion of part of a sphere, the convex end part of the push slider being in direct spherical contact with the concave end part of the piston, and a rotational motion of said motor being converted into a linear motion of the push slider on an axis parallel to said rotating shaft, wherein a radially extending guide projection is foamed on one side of the push slider, the guide projection being fitted into an axially extending groove of the casing so that the push slider is movable within the casing only in an axial direction of the push slider, and wherein a push plate is connected to the push slider on a side opposite to where the guide projection is formed, wherein the motor and the cylinder are mounted, respectively, on upper and lower portions of one side of the casing.

12. The hydraulic modulator for a brake device according to claim 11, said hydraulic modulator further including a stroke sensor having a sensor rod retractably supported for detecting the position of said push slider;

said stroke sensor being arranged so that said sensor rod extends parallel to said cylinder.

13. The hydraulic modulator for a brake device according to claim 12, wherein said cylinder and said stroke sensor are set smaller in axial size than an axial size of said motor.

14. The hydraulic modulator for a brake device according to claim 11, wherein said power transmitting means comprises a ball screw mechanism for converting the rotational motion to the linear motion.

15. The hydraulic modulator for a brake device according to claim 14, wherein the ball screw mechanism includes a ball screw nut, balls, and a ball screw shaft.

16. The hydraulic modulator for a brake device according to claim 12, wherein the rotating shaft extends lengthwise in an axial direction beyond both ends of the cylinder and both ends of the push slider of the power transmitting means.

17. The hydraulic modulator for a brake device according to claim 12, wherein the push plate is connected to the push slider in order to push on a free end the retractable sensor rod, and moving the free end of the sensor rod closer to the stroke sensor during the linear motion of the push slider toward the piston.

18. The hydraulic modulator for a brake device according to claim 12, further comprising a return spring installed in the cylinder, the return spring being adapted to constantly bias the piston against the push slider.

19. A hydraulic modulator for a brake device comprising:

a cylinder for slidably supporting a piston and changing the volume of a hydraulic chamber communicating with a brake caliper according to the sliding of said piston; and a motor mounted above said cylinder for sliding said piston through power transmitting means;

said power transmitting means being arranged so that said cylinder extends parallel to a rotating shaft of said motor;

wherein said power transmitting means includes a push slider for pushing the piston, the push slider having an convex end part shaped as an outer portion of part of a sphere, and the piston having an concave end part shaped as an inner portion of part of a sphere, the convex end part of the push slider being in direct spherical contact with the concave end part of the piston, and a rotational motion of said motor being converted into a linear motion of the push slider on an axis parallel to said rotating shaft, wherein a radially extending guide projection is foamed on one side of the push slider, the guide projection being fitted into an axially extending groove so that the push slider is movable within the hydraulic modulator only in an axial direction of the push slider, and wherein a push plate is connected to the push slider on a side opposite to where the guide projection is formed.

20. The hydraulic modulator for a brake device according to claim 19, said hydraulic modulator further including a stroke sensor mounted below the cylinder and having a sensor rod retractably supported for detecting the position of said push slider, wherein said cylinder and said stroke sensor are set smaller in axial size than an axial size of said motor.

* * * * *